United States Patent Office
3,810,785
Patented May 14, 1974

3,810,785
CARBON FIBER COMPOSITE STRUCTURES
Christopher John Dominic and Edward William Garnish, Saffron Walden, England, assignors to Ciba (A.R.L.) Limited, Duxford, Cambridge, England
No Drawing. Filed Aug. 26, 1970, Ser. No. 67,219
Claims priority, application Great Britain, Sept. 9, 1969, 44,579/69
Int. Cl. B32b 27/04, 27/12
U.S. Cl. 117—161 ZB                          19 Claims

ABSTRACT OF THE DISCLOSURE

Process for making composite structures which comprises impregnating carbon fibres with a solution in an organic solvent of:

(a) a mixture of triglycidyl isocyanurate and an epoxide-containing adduct, prepared by heating together in the liquid state triglycidyl isocyanurate with a stoichiometric deficit, calculated on the basis of one amino hydrogen atom per epoxide group, of an aromatic primary amine containing not more than two hydrogen atoms directly attached to nitrogen, and (b) a curing agent in a quantity sufficient to cure the mixture of triglycidyl isocyanurate and epoxide-containing adduct, and then drying the impregnated fibres.

---

This invention relates to processes of making composite structures and to the structures so made.

Materials with high specific strengths and stiffness are very desirable for the construction of many powered vehicles or machinery, e.g. in aerospace vehicles and their engines. Recently it has been shown that highly crystalline whiskers and fibres of some of the lighter elements afford a means of making such materials. For example, British patent specification 1,110,791 discloses a method of making graphitized carbon fibres that have a remarkably high tensile strength and modulus but a relatively low density. With a suitable resinous binder, composite structures can be made which are comparable in strength and stiffness with a good steel but are very much lighter.

Several kinds of resinous binders have been proposed for carbon fibres. Carbon fibres can withstand oxidizing atmospheres at temperatures up to about 400° C. and, to take advantage of this property, resins with high resistance to heat are needed. Frequently thermosetting resins are used, these being coverted on the fibres into a cross-linked, infusible material by reaction with a curing agent.

To prepare a composite structure from carbon fibres, they may be impregnated with a solution of the resin and its curing agent in an organic solvent, then the solvent is evaporated, to leave a "prepreg." The resin is cured, when required, by heating. Or the fibres may be impregnated with a liquid mixture, which is essentially solvent-free, of the resin and the curing agent, then, before curing of the resin mixture has advanced too far, the composite is moulded into the desired shape by heating under pressure, and the resin is cured. A third method comprises contacting a layer of the fibres with a curable mixture of resin and its hardening agent in the form of a film, and then heating and pressing the assembly so that the film softens, flows around the fibres, and the mixture cures.

The resinous binder should be convenient to handle and to cure. Also, there should be a very high degree of adhesion between this binder and the fibres.

Triglycidyl isocyanurate is an epoxide resin currently attracting interest, because it has a low viscosity when molten and so forms the basis of impregnating compositions which flow well, and because generally the cured products have good thermal and electrical properties. However, for making composite structures, it has certain drawbacks.

As prepared from cyanuric acid and epichlorohydrin by the methods given in the earlier literature, it is an impure liquid or low-melting solid having a low epoxide content, typically 5 to 7 epoxide equivalents per kg. (the theoretical value is 10.1 equivalents per kg.), and a high proportion of combined chlorine. It is difficult to obtain a product which is of consistent quality, and the storage stability is poor.

Lately, methods have been described by which triglycidyl isocyanurate can be obtained as a pure, crystalline solid having adequate stability. This form, too, is inconvenient for impregnating, because, as it is not readily soluble in the common solvents, it has to be heated to above 100° C. to melt it for mixing with the curing agent and for impregnating the fibres; hence the curing reaction may occur prematurely. Another objection is that, on cooling, the pure epoxide compound recrystallizes, and so complete impregnation does not take place. Also, the prepreg is weak and cannot be handled easily.

It has now been found that these disadvantages can be overcome by using as the resinous binder a mixture containing certain curable adducts of triglycidyl isocyanurate.

Accordingly, this invention provides a process for making composite structures which comprises impregnating carbon fibres with a solution in an organic solvent of:

(a) a mixture of triglycidyl isocyanurate and an epoxide-containing adduct, prepared by heating together in the liquid state triglycidyl isocyanaurate with a stoichiometric deficit, calculated on the basis of one amino hydrogen atom per epoxide group, of an aromatic primary amine containing not more than two hydrogen atoms directly attached to nitrogen, and (b) a curing agent in a quantity sufficient to cure the mixture of triglycidyl isocyanurate and epoxide-containing adduct, and then drying the impregnated fibres.

Such mixtures, used as binders for carbon fibres, generally exhibit higher adhesive forces than do compositions based on a conventional type of epoxy resin, e.g. the polyglycidyl ethers of, for example, 2,2-bis(4-hydroxyphenyl)propane or phenol-formaldehyde novolaks. By the process of this invention, composite structures can be made having high mechanical strengths at temperatures in excess of 200° C. The mixtures of triglycidyl isocyanurate and adduct are usually light-colored, solid at room temperature and melting at lower temperatures than does pure triglycidyl isocyanurate. They readily dissolve in many common solvents, and their stability on storage is usually surprisingly high.

The adducts are preferably made from triglycidyl isocyanurate containing at least 8, and better, at least 9, epoxide equivalents per kilogram. If wished, the components may be heated together in an inert, volatile solvent which does not react under the conditions used with the amine or triglycidyl isocyanurate, such as a dialkyl ketone containing not more than six carbon atoms, e.g. acetone, or a chlorinated hydrocarbon containing not more than four carbon atoms, such as methylene dichloride. The temperature to which the reactants are heated will depend on whether a solvent is used, and on the melting points of the triglycidyl isocyanurate, the aromatic amine, or their mixtures, but it will usually be at least 50° C. and at most 175° C., and preferably it is at least 100° C.: it will, of course, be below the decomposition temperature of the triglycidyl isocyanurate or the aromatic amine. Any residual solvent is removed and the molten mixture is allowed to cool. Alternatively, the triglycidyl isocyanurate can be melted, and the aromatic amine added in small portions, time being allowed between successive additions for the reaction to proceed to a substantial extent. In most cases sufficient aromatic amine will be used to provide from about 0.05 to about 0.5, especially from 0.05 to 0.25, amino hydrogen equivalent per 1,2-epoxide equivalent of the triglycidyl isocyanurate.

Aromatic amines used to form the adducts advisably do not contain groups, other than the primary amino group directly attached to an aromatic nucleus, able to react with the epoxide groups of the triglycidyl isocyanurate under the conditions in which the adducts are formed. Example of such amines are aniline, o-, m- and p-toluidine, o-ethylaniline, o-, m- and p-chloroaniline, and p-phenylaniline.

Particularly suitable amines have the formula

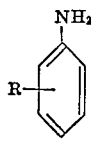

where R denotes hydrogen, chlorine, or a methyl or ethyl group.

The curing agent may be a polyamine, e.g. an aliphatic polyamine, such as diethylenetriamine, triethylenetetramine, N-(2-hydroxyethyl)-, N-(2-hydroxypropyl)- or N-(2 - cyanoethyl)-diethylenetriamine, tetraethylenepentamine, propane-1,2-diamine, propane-1,3-diamine, and 2,2,4-trimethyl- and 2,3,3-trimethyl-hexane-1,6-diamines; a cycloaliphatic polyamine, such as bis(4-aminocyclohexyl)methane,
bis(4-amino-3-methylcyclohexyl)methane,
2,2-bis(4-aminocyclohexyl)propane, and
3-aminomethyl-3,5,5-trimethylcyclohexylamine (isophoronediamine);

an aromatic polyamine, such as bis(4-aminophenyl)methane,
anilineformaldehyde resins,
bis(4-aminophenyl)sulphone,
bis(4-aminophenyl)sulphide,
bis(4-aminophenyl)ether,
bis(4-aminophenyl) ketone, and
m-, o- and p-phenylenediamines;

or a heterocyclic polyamine, such as

N-(2-aminoethyl)-piperazine.

There may also be used poly(aminoamides), such as those prepared from aliphatic polyamines and dimerized or trimerized fatty acids; dicyandiamide; polycarboxylic acid anhydrides such as phthalic anhydride,
1,2,3,6-tetrahydrophthalic anhydride,
methyl-1,2,3,6-tetrahydrophthalic anhydride,
methylendomethylene-1,2,3,6-tetrahydrophthalic anhydride,
hexahydrophthalic anhydride,
methylhexahydrophthalic anhydride,
benzophenone-3,3',4,4'-tetracarboxylic acid dianhydride,
pyromellitic dianhydride,
maleic anhydride,
succinic anhydride,
dodecenylsuccinic anhydride,
nonenylsuccinic anhydride,
polysebacic anhydride, and
polyazelaic anhydride, as well as polycarboxylic acids such as phthalic acid, 1,2,3,6-tetrahydrophthalic acid, hexahydrophthalic acid, isophthalic acid, terephthalic acid, adipic acid, succinic acid, dodecenylsuccinic acid, and acidic polyesters from such acids and glycols; and polyhydric phenols such as resorcinol, hydroquinone, 2,2 - bis(4 - hydroxyphenyl)propane, and novolak resins formed between formaldehyde, acetaldehyde, chloral or furfuraldehyde, and phenols such as phenol itself, p-chlorophenol, p-cresol or p-tert. butylphenol.

There may also be used catalytic curing agents, including tertiary amines such as 2,4,6-tris(dimethylaminomethyl) phenol, N-benzyldimethylamine, and triethanolamine; alkali metal alkoxides of alcohols such as 2,4-dihydroxy-3-hydroxymethylpentane; stannous salts of alkanoic acids such as stannous octanoate; Friedel-Crafts catalysts such as boron trifluoride and its complexes with diethyl ether and monoamines such as ethylamine, diethylamine, and piperidine; and chelates of boron trifluoride, such as pentane-2,4-diono boron difluoride.

The preferred curing agents are polycarboxylic acid anhydrides, which are normally used in a proportion such as to supply from 0.7 to 1.2 carboxylic acid anhydride equivalents per 1,2-epoxide equivalent of the mixture of triglycidyl isocyanurate and adduct; polyamines, especially aromatic polyamines, which are normally used in a proportion such as to supply from 0.8 to 1.2 amino-hydrogen equivalents per 1,2-epoxide equivalent of the mixture; tertiary amines, and complexes of boron trifluoride, especially with monoamines, in quantity sufficient to convert the mixture into an infusible, insoluble product. bis(4-aminophenyl) sulphone and complexes of boron trifluoride with monoamines are particularly suitable.

Solvents which may be used for impregnating the carbon fibres with the mixture of triglycidyl isocyanurate adduct and the curing agent, include lower ketones, i.e. dialkyl ketones containing not more than six carbon atoms, such as acetone; chlorinated hydrocarbons containing not more than four carbon atoms but at least two chlorine atoms, such as methylene dichloride.

The following examples illustrate the invention. Unless otherwise indicated, parts and percentages are by weight, and interlaminar shear strengths were determined following the procedure given in ASTM specification D2344-65T.

"Epoxide resin I" denotes a polyglycidyl ether of a phenolformaldehyde novolak, having an epoxide content of approximately 5.4 equiv./kg. and a softening point (ball and ring method) in the range 35° to 48°. This epoxide resin was chosen for comparison with the mixtures of the present invention because it gives products having a high heat distortion temperature. Similar results are obtainable with other conventional epoxide resins.

EXAMPLE I

A mixture of powdered triglycidyl isocyanurate having an epoxide content of 9.69 equiv./kg. (100 parts), aniline (8 parts, i.e. 0.18 amino-equiv.) and acetone (35 or 125 parts) was stirred while heating so that the acetone gradually distilled off. The temperature of the mixture was raised to 150° C. over a period of 30 to 90 minutes and maintained at that level for a further 40 to 45 minutes. The mixture was then poured into shallow trays and allowed to cool. The resultant pale yellow solid had an epoxide content of 7.7 equiv./kg., and its softening point (as determined by the Koffler method) was 45° C. The solid was quite stable: thus, its epoxide content was 7.45 equiv./kg. after it had been heated for 48 hours at 100° C., and even after 1 week at 100° C. its epoxide content was still 6.86 equiv./kg.

Boron trifluoride-monoethylamine complex (4 parts) was added, followed by acetone to form a solution with a solids content of 30%.

A layer of Type II treated carbon fibres, manufactured by the Morganite Research and Development Co. Ltd., was impregnated with this solution and left at room temperature for 1 hour; the solvent was then removed by heating the impregnated fibres for 16 hours at 70° C. in a fanned oven. A sheet of unidirectional impregnated fibres was obtained about 0.5 mm. thick and contained about 55% by volume of resin binder. The softening point of the binder was still less than 50° C., and the sheet, although stiff at room temperature, could still be used to make a cured composite.

Nine such sheets, laid in a uniform direction, were pressed in an open-ended mould. The temperature was raised to 150° C. over 15 minutes under a pressure of 0.35 kp./sq. cm. A pressure of 7 kp./sq. cm. was then applied and the composite heated for 1 hour at 180° C. The structure was post-cured by heating for 3 hours at 190° C. without applied pressure. The cured composite was about 2.5 mm. thick and contained about 60% by volume of carbon fibres.

The interlaminar shear strength of the composite, tested in 3-point loading jigs, was 1080 kp./sq. cm. at 20° C. and the ultimate flexural strength was 12360 kp./sq. cm. at 20° C.

For comparison, a composite was made in a similar manner using a solution of Epoxide Resin I (100 parts), $BF_3$-monoethylamine complex (4 parts) and sufficient acetone to give a 30–40% solution to impregnate the carbon fibres.

The interlaminar shear strength was only 710 kp./sq. cm. at 22° C.

EXAMPLE II

A solution of the triglycidyl isocyanurate-aniline adduct of Example I (100 parts) and bis(4-aminophenyl) sulphone (57.5 parts) in acetone (200 parts) was used to impregnate carbon fibres in the manufacture of a composite as described in Example I. In this case the solvent was removed by heating at 100° C. for 1 hour.

The cured composite was about 2.6 mm. thick and contained about 55% by volume of carbon fibres.

The interlaminar shear strength was 1005 kp./sq. cm. at 22° C. and 610 kp./sq. cm. at 170° C.

EXAMPLE III

Powdered triglycidyl isocyanurate (100 parts), 7.5 parts of p-toluidine (0.14 amino-equiv.) and 125 parts of acetone were stirred together while being heated, as described in Example I. The mixture was heated to 150° C. over 30 minutes, and kept at that temperature for a further 45 minutes, then poured into shallow trays and heated at 120° C. under reduced pressure for 2 hours. On cooling, a pale yellow solid having an epoxide content of 7.66 equiv./kg. was left.

Another adduct mixture was prepared in the same manner from 100 parts of a less pure triglycidyl isocyanurate, having an epoxide content of 9.27 equiv./kg., and 5 parts (0.1 amino-equiv.) of p-toluidine. The epoxide content of this adduct mixture was 7.2 equiv./kg.

Carbon fibres were impregnated with a solution in acetone of the adduct mixture and bis(4-aminophenyl) sulphone, as described in Example II, and the composites were cured, with similarly good results.

EXAMPLE IV

A mixture of powdered triglycidyl isocyanurate having an epoxide content of 9.07 equiv./kg. (100 parts), aniline (8 parts) and acetone 80 parts was heated to boiling, with stirring, and the acetone allowed to evaporate. When the temperature reached 120° C. the mixture was placed in an oven at 120° C. and remained there for 30 minutes, it was then placed in an oven at 150° C. for 45 minutes, after which it was poured into shallow trays and heated at 120° C. in vacuo for 2 hours. The resultant product was allowed to cool and had an epoxide content of 7.43 equiv./kg.

Carbon fibre composites were made from this material by the method described in Example I. The interlaminar shear strength and ultimate flexural strength at various temperatures are given in the following Table I.

TABLE I

| Temperature (° C.) | Fibre content | Interlaminar shear strength (kp./sq. cm.) | Ultimate flexural strength (kp./sq. cm.) |
|---|---|---|---|
| 22 | 65 | 1,037 | 12,300 |
| 100 | 64 | 884 | 16,450 |
| 120 | 66 | 790 | 15,257 |
| 150 | 66 | 537 | 12,300 |

EXAMPLE V

The method given in Example IV was repeated, but 12 and 14 parts of aniline were used to give products having epoxide contents of 6.60 and 6.19 equiv./kg., respectively. The interlaminar shear strengths and flexural srtengths are given in Table II.

TABLE II

| Aniline (parts) | Temperature (° C.) | Fibre content (percent) | Interlaminar shear strength (kp./sq. cm.) | Ultimate flexural strength (kp./sq. cm.) |
|---|---|---|---|---|
| 12 | 22 | 61 | 1,195 | 11,740 |
| 12 | 100 | 64 | 792 | 15,720 |
| 12 | 120 | 63 | 552 | 15,622 |
| 12 | 150 | 62 | 451 | 7,660 |
| 14 | 22 | 58 | 1,264 | 17,310 |
| 14 | 100 | 59 | 801 | 14,620 |
| 14 | 120 | 58 | 622 | 14,830 |
| 14 | 150 | 59 | 343 | 3,550 |

EXAMPLE VI

The method given in Example IV was repeated, but instead of 8 parts of aniline there was used 11 parts of p-chloraniline, 11,8 parts of p-phenetidine or 10.6 parts of p-anisidine to give products having epoxide contents of 7.25, 7.12, and 7.26 equiv./kg., respectively.

The interlaminar shear strengths and ultimate flexural strengths are given in Table III.

TABLE III

| Amine | Temperature (° C.) | Fibre content, (percent) | Interlaminar shear strength (kp./sq. cm.) | Ultimate flexural strength (kp./sq. cm.) |
|---|---|---|---|---|
| p-Chloraniline | 22 | 66 | 1,103 | 15,326 |
|  | 100 | 64 | 918 | 17,440 |
|  | 120 | 64 | 801 |  |
|  | 150 | 65 | 502 | 11,740 |
| n-Phenetidine | 22 | 63 | 991 | 10,460 |
|  | 100 | 67 | 896 | 13,800 |
|  | 120 | 63 | 749 | 11,410 |
|  | 150 | 65 | 578 | 10,970 |
| p-Anisidine | 22 | 65 | 955 | 10,510 |
|  | 100 | 65 | 839 | 11,868 |
|  | 120 | 67 | 766 | 14,307 |
|  | 150 | 64 | 545 | 11,763 |

What is claimed is:

1. Process for making composite structures which comprises impregnating carbon fibers with a solution in an organic solvent of:
   (a) a mixture of triglycidyl isocyanurate and an epoxide containing adduct, prepared by heating together in the liquid state triglycidyl isocyanurate with 0.05 to 0.5 amino hydrogen equivalent of an aromatic primary mono-amine containing not more than two hydrogen atoms directly attached to nitrogen per 1,2-epoxide equivalent of the triglycidyl isocyanurate, and
   (b) a curing agent in a quantity sufficient to cure the mixture of triglycidyl isocyanurate, and epoxide-containing adduct and then drying the impregnated fibers.

2. Process according to claim 1, wherein there is used sufficient of the aromatic monoamine to provide from 0.05 to 0.25 amino hydrogen equivalent per 1,2-epoxide equivalent of the triglycidyl isocyanurate.

3. Process according to claim 1 wherein the aromatic primary amine has the formula

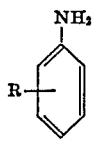

where R denotes hydrogen, chlorine, or a methyl or ethyl group.

4. Process according to claim 3 wherein the aromatic primary amine is aniline, o-, m-, or p-toluidine, o-ethylaniline, or o-, m-, or p-chloroaniline.

5. Process according to claim 1 wherein the adducts are made from triglycidyl isocyanurate containing at least 8 epoxide equivalents per kilogram.

6. Process according to claim 5 wherein the adducts are made from triglycidyl isocyanurate containing at least 9 epoxide equivalents per kilogram.

7. Process according to claim 1 wherein said mixture is made by heating the triglycidyl isocyanurate and the aromatic primary amine in an inert volatile solvent.

8. Process according to claim 7 wherein the solvent is a dialkyl ketone containing not more than six carbon atoms, or a chlorinated hydrocarbon containing not more than four carbon atoms.

9. Process according to claim 1 wherein the adducts are made by heating the triglycidyl isocyanurate and the aromatic primary amine at a temperature between 50° C. and 175° C.

10. Process according to claim 9 wherein the reactants are heated at a temperature between 100° C. and 175° C.

11. Process according to claim 1 wherein the curing agent is an aliphatic polyamine, a cycloaliphatic polyamine, an aromatic polyamine, a heterocyclic polyamine, a poly(aminoamide), dicyandiamide, a polycarboxylic anhydride, a polycarboxylic acid, a polyhydric phenol, a tertiary amine, an alkali metal alkoxide, a stannous salt of an alkanoic acid, a Friedel-Crafts catalyst, or a chelate of boron trifluoride.

12. Process according to claim 11 wherein the curing agent is a polycarboxylic acid anhydride.

13. Process according to claim 12 wherein sufficient polycarboxylic acid anhydride is used to supply from 0.7 to 1.2 carboxylic acid anhydride equivalents per 1,2-epoxide equivalent of the mixture of triglycidyl isocyanurate and adduct.

14. Process according to claim 11 wherein the curing agent is an aromatic polyamine.

15. Process according to claim 14 wherein sufficient of the amine curing agent is used to supply 0.8 to 1.2 aminohydrogen equivalents per 1,2-epoxide equivalent of the mixture of triglycidyl isocyanurate and adduct.

16. Process according to claim 11 wherein the curing agent is a tertiary amine or a complex of boron trifluoride with a monoamine.

17. Process according to claim 1 wherein the organic solvent for the impregnating solution is a dialkyl ketone containing not more than six carbon atoms or a chlorinated hydrocarbon containing not more than four carbon atoms and at least two chlorine atoms.

18. A carbon fiber composite comprising carbon fibers impregnated with a mixture of a triglycidyl isocyanurate and an epoxide containing adduct prepared by heating together in a liquid state triglycidyl isocyanurate with 0.05 to 0.5 amino hydrogen equivalent of an aromatic primary mono-amine containing not more than two hydrogen atoms directly attached to nitrogen per 1,2-epoxide equivalent of the triglycidyl isocyanurate and a curing agent in sufficient quantity to cure said triglycidyl isocyanurate, and epoxide containing adduct.

19. A carbon fiber composite comprising the heat cured product of claim 18.

References Cited
UNITED STATES PATENTS

| | | | |
|---|---|---|---|
| 3,655,624 | 4/1972 | Saran et al. | 260—830 TW |
| 3,409,590 | 11/1968 | Landua et al. | 117—161 ZB |
| 3,676,200 | 7/1972 | Rembold et al. | 117—161 ZB |
| 3,479,302 | 11/1969 | Saran | 260—2 EC |

WILLIAM D. MARTIN, Primary Examiner

W. H. SCHMIDT, Assistant Examiner

U.S. Cl. X.R.

260—2 EA, 2 EC, 2 N, 32.8 EP, 33. 8 EP, 47 EP, 830 TW